Aug. 17, 1971    H. DAGUENET    3,600,232
ELECTRICAL STORAGE BATTERY
Filed Jan. 27, 1969
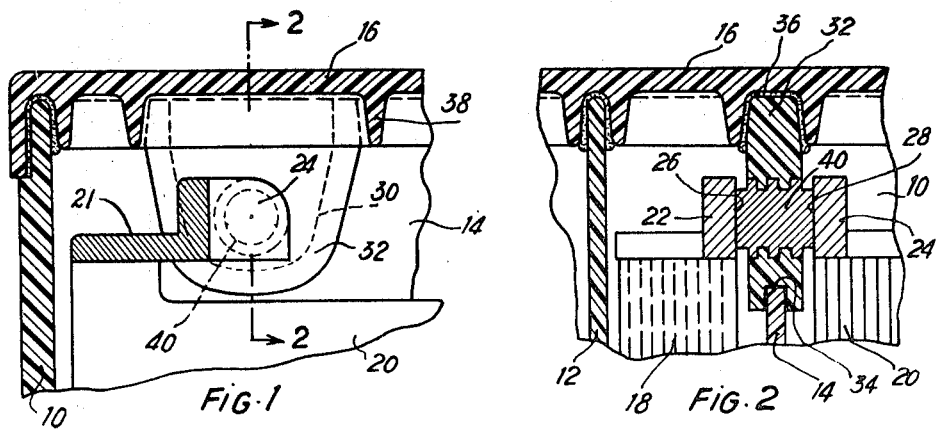
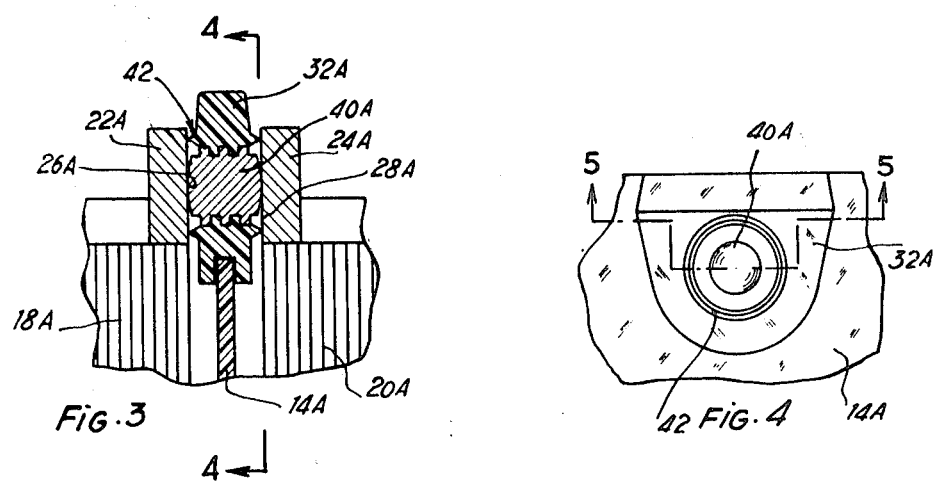
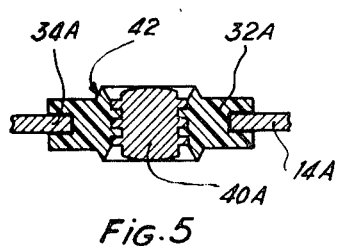

United States Patent Office 3,600,232
Patented Aug. 17, 1971

3,600,232
ELECTRICAL STORAGE BATTERY
Henri Daguenet, Le Mans, France, assignor to
Societe Industrielle des Comprimes de l'Ouest
Filed Jan. 27, 1969, Ser. No. 793,936
Claims priority, application France, Jan. 25, 1968,
137,354
Int. Cl. H01m 35/32
U.S. Cl. 136—134
6 Claims

ABSTRACT OF THE DISCLOSURE

The battery comprises a plurality of cells separated by tight partitions each including plates connected at their tops by a plate bridge, the electrical connection between bridges of adjacent cells being effected by means of a conducting member embedded in an insulating part sealingly engaged in a slot provided in the top edge of the partition between said adjacent cells. The conducting member has its lateral faces welded to the vertical faces of the plate bridge portions that are adjacent to said lateral faces. Each of the lateral faces of the conducting member is surrounded by a closed rib having a constant height integrally molded with said insulating part, the shape of said closed rib being such that it is adapted to engage without any discontinuity the portion of plate bridge adjacent thereto.

---

In the past, the plate bridges of storage batteries located in separate cells were connected by bars straddling the partitions between said cells and for this reason the internal resistance of the battery was substantial because of the length of the electrical connection.

It has been proposed to have very short connections passing through the partitions between adjacent cells. In this case, the plate bridges comprise symmetrical projections extending at a right angle with respect to the partition to be crossed. These projections are introduced into an opening cut-out in said partition and after their introduction the ends of said projections are welded, a clamping force being simultaneously exerted so that a good tightness is obtained around the opening by engagement of lugs carried by the plate bridges with respective faces of the partition. Such a method of manufacturing has to be executed in a very delicate manner, since it comprises obtaining simultaneously a weld and a seal in a single step. The success of the operation depends on an accurate positioning of the openings in the partitions. Furthermore, the battery thus obtained is substantially oversized since the widths of the cells have to take into account the distances the projections penetrate into the partitions.

A battery has also been proposed which comprises a plurality of cells separated by tight partitions each including plates connected to their tops by a plate bridge, the electrical connection between bridges of adjacent cells being effected by means of a conducting member embedded in an insulating part sealingly engaged in a slot provided in the top edge of the partition between said adjacent cells.

In a battery of this type, the conducting member providing the connection between adjacent plate bridge comprises on both sides of the portion embedded in the insulating material lugs that are each provided in a vertical bore, the two bores of said member being slipped over vertically extending cylindrical projections carried by the plate bridges to be connected that are located in said adjacent cells.

In the battery defined hereinabove, the problem consisting of separating the welding and sealing functions is solved but the resistance of the connections remains substantial and furthermore the welding operation has to be executed by means of a welding torch instead of a more modern method such as resistance welding or high frequency welding.

The object of this invention is to obtain a battery having a small internal resistance and comprising very short connections, in which the welding of the conducting member and the tightness between adjacent cells are obtained in separate steps, such a battery being simply manufactured at low cost.

Such a problem is solved in a battery of the above defined type which is characterized in that the conducting member has its lateral faces welded to the vertical faces of the plate bridge portions that are adjacent to said lateral faces.

The welding step generally comprises a resistance welding by means of an electrical current of thousand amperes and even if the operation is executed with great care, one runs the risk of having lead droplets striking the plates located in the cells which results in very serious drawbacks.

To avoid such a disadvantage, according to another feature of the invention, each of the lateral faces of the conducting member is surrounded by a closed rib having a constant height integrally molded with said insulating part, the shape of said closed rib being such that it is adapted to engage without any discontinuity the portion of plate bridge adjacent thereto.

It is easily understood that thanks to the latter features of the invention any projection of metal toward the plates of the battery during the welding operation is avoided since the aforesaid ribs act as perfect screens which contain the fused metal. The ribs are easily moulded on the insulating part whereas their provision on the battery partition itself is not possible because the container of the battery could not be withdrawn from its mould as will be easily understood by the one skilled in the art. Projecting ribs have already been proposed on the lead lugs carried by the plate bridges which are concentric in the aforementioned cylindrical projections but such lead ribs are only provided to improve the tightness around the opening through the partition without any efficient action against the projections of metal during the welding operation.

The invention will now be described hereinafter with reference to the accompanying drawings:

FIG. 1 is a fragmentary lateral cross-sectional view in a vertical plane of a battery according to the invention.

FIG. 2 is a cross-sectional view along line 2—2 of FIG. 1, the conducting member being shown associated with the corresponding partition of the battery container and with the cover of the latter.

FIG. 3 is a fragmentary vertical cross sectional view of an electrical connection according to a modification of the invention.

FIG. 4 is a view taken along line 4—4 of FIG. 3 showing in plane view the insulating part in which is embedded the conducting member of the connection between adjacent cells, and FIG. 5 is a cross sectional view along line 5—5 of FIG. 4.

When considering the drawings, and more especially FIGS. 1 and 2, there is shown a battery container divided into a plurality of separate cells by vertical partitions such as 12 and 14 which are parallel and regularly spaced from one another. The cover 16 is mounted on the peripheral top edge of container 10 and on the edges of the partitions. The tightness between the container and the cover thereof is provided by means of a cement or by welding if the material used permits such a welding.

In the separate cells defined by the transversal partitions are located plates 18, 20. The plates are connected at the tops thereof by lead or lead alloy conducting elements constituting plate bridges 21 having lugs 22, 24 one face of which 26, 28 respectively extend in the vicinity of the partition 14 substantially parallel to the latter.

Substantially at the level of lugs 22 and 24 there has been provided in the top edge of partition 14 a U-shaped slot 30. In slot 30 is located an insulating part 32 comprising at its periphery a median groove 34 (except at its top edge 36). The groove 34 has a size slightly larger than the thickness of the partition 14 so that it may receive the latter with interposition of cement or the like. The top 36 of the insulating part 32 is sealingly received in a cavity defined in cover 16 by a rib 38.

In insulating part 32 is embedded a conducting element 40 made of lead or lead alloy, which is of cylindrical shape in the shown example, the lateral faces of which are adapted to engage the faces 26 and 28 of lugs 22, 24 with a view to being connected to the latter by a resistance welding operation.

To improve the holding of member 40 in part 32 there has been provided in the cylindrical surface of said member a certain number of square cross section grooves.

The mounting of the battery which has been described hereinabove is effected as follows: The plates are lowered into their respective cells. The insulating parts 32 are slipped into their slots 30 after suitable cement has been introduced into their grooves 34. The lugs 22, 24 are resistance welded on the lateral faces of the members 40. The cover 16 of the battery is then put in place and cemented or welded.

When executing the above method of mounting the battery, projections of fused lead toward the plates are to be strictly avoided. Any risk may be totally discarded by modifying the insulating part as will be now described with reference to FIGS. 3 to 5.

In these FIGS. 3 to 5, there is represented an insulating part 32A similar to the above part 32, the groove 34A of which is inserted in a corresponding slot provided in a partition 14A extending between adjacent cells. These cells contain stacks of plates 18A and 20A the plate bridges of which are provided with lugs 22A–24A adapted to be welded on the lateral faces of a conducting member 40A embedded in part 32A.

In FIG. 5, where the elements of the connection are shown before the welding operation, it may be seen that the convex lateral faces of conducting member 40A are encircled by a projecting rib 42 integrally moulded with part 32A. There is provided a rib 42 on each side of part 32A, its height has a constant value and in the shown embodiment it is substantially circular and concentric with respect to the cylindrical conducting member 40A. The size of rib 42 is such that it is adapted to engage by its edge the flat face of the adjacent lug. For improving the close contact between the rib and said flat face and for permitting a slight crushing of the rib during the welding operation, said rib is of triangular radial cross section, and its sharp edge has an apex angle of about 60°. The convex end portions of member 40A are somewhat depressed with respect to the level of the edge of the ribs but they may contact the lugs of the plate bridges during the welding operation thanks to the flexibility of the ribs. The engagement of the ribs with the partition during the welding operation being perfect one does not run the risk of having lead droplets falling on the plates.

What I claim is:
1. An electrical storage battery comprising:
   a container having a plurality of vertical partitions whereby said container is divided into a plurality of fluid-tight cells;
   a plurality of plates contained within the cells;
   bridge plate means having vertically-extending faces connected to the tops of the plates within the cells;
   at least one of said partitions having a slot in the top portion thereof;
   insulating means sealingly received in said slot;
   conducting means having vertical faces sealingly received in said insulating means arranged so that said conducting means vertical faces abut said bridge means' vertical faces and are welded thereto;
   said insulating means including means forming a closed rib having a constant height, integrally molded with said insulating means and surrounding said conducting means, the shape of said rib being such that it is adapted to engage without any discontinuity the portion of said bridge plate means adjacent thereto; and
   a cover mounted on said container, partitions and insulating means.
2. A storage battery as claimed in claim 1, wherein said conducting member is substantially cylindrical and said rib is circular and concentric to said member.
3. A storage battery as claimed in claim 2 wherein said rib has a given flexibility so as to permit its crushing during the clamping effected when the welding is made.
4. A storage battery as claimed in claim 3 wherein said rib is provided with a sharp edge having an apex angle of substantially 60°.
5. A storage battery as claimed in claim 4 wherein the lateral faces of said conducting member are convex before being welded.
6. A storage battery as claimed in claim 5 wherein the thickness of the insulating part measured from one edge of one rib on one side of said plate to the other edge of the rib on the opposite side of said part is larger than the axial overall size of the conducting member embedded in said part.

References Cited

UNITED STATES PATENTS

| 1,828,393 | 10/1931 | Chilton | 136—134 |
| 1,892,962 | 1/1933 | Patterson, Jr. | 136—134 |
| 1,919,902 | 7/1933 | Nyce | 136—134 |
| 3,253,962 | 5/1966 | Deprill et al. | 136—134 |
| 3,364,076 | 1/1968 | Buttke et al. | 136—134 |
| 3,484,299 | 12/1969 | Nyberg et al. | 136—134 |

FOREIGN PATENTS

| 320,515 | 5/1957 | Germany | 136—134 |
| 1,000,611 | 8/1965 | Great Britain | 136—134 |

ANTHONY SKAPARS, Primary Examiner

U.S. Cl. X.R.

136—176